US005583682A

United States Patent [19]

Kitayama et al.

[11] Patent Number: 5,583,682

[45] Date of Patent: Dec. 10, 1996

[54] LIQUID CRYSTAL DEVICE FOR GRADATIONAL DISPLAY

[75] Inventors: Hiroyuki Kitayama, Isehara; Kenji Shinjo; Syuji Yamada, both of Atsugi, all of Japan

[73] Assignee: Canon Kabushiki Kaisha, Tokyo, Japan

[21] Appl. No.: 253,160

[22] Filed: Jun. 2, 1994

[30] Foreign Application Priority Data

Jun. 2, 1993 [JP] Japan .................................... 5-154557

[51] Int. Cl.[6] ............................ C09K 19/02; G02F 1/141

[52] U.S. Cl. ............................................ 349/172; 349/133

[58] Field of Search ................................ 359/78, 90, 100

[56] References Cited

U.S. PATENT DOCUMENTS 4,931,208 8/1988 Furukawa ........................... 252/299.61
5,078,477 1/1992 Jono .......................................... 359/91
5,169,556 12/1992 Mochizuki ......................... 252/299.62
5,305,131 4/1994 Terada ..................................... 359/104

FOREIGN PATENT DOCUMENTS 302226 12/1989 Japan .

*Primary Examiner*—William L. Sikes
*Assistant Examiner*—Tiep H. Nguyen
*Attorney, Agent, or Firm*—Fitzpatrick, Cella, Harper & Scinto

[57] ABSTRACT

A liquid crystal device for gradational display, comprising: a pair of substrates each provided with an electrode, and a liquid crystal layer comprising a chiral smectic liquid crystal disposed between the substrates; the pair of substrates each having thereon alignment control layer provided with a uniaxial alignment axis, wherein aid liquid crystal layer comprises a striped region and a non-striped region where (1) the striped region and the non-striped region each assume a homogeneous alignment state, (2) the striped region extends in a direction perpendicular to the direction of the uniaxial alignment axis, and (3) each of liquid crystal molecules within the striped region and the non-striped region show bistability; and the liquid crystal molecules within the striped region have a threshold voltage, for switching between two stable states, different from that given by the liquid crystal molecules within the on-striped region. The above two regions (striped and non-striped region) having different threshold voltages each other are suitable as a display region for a liquid crystal device providing good gradation characteristic.

9 Claims, 9 Drawing Sheets

LIQUID CRYSTAL DEVICE FOR GRADATIONAL DISPLAY

FIELD OF THE INVENTION AND RELATED ART

This invention relates to a liquid crystal device or a liquid crystal-optical shutter, etc., particularly a liquid crystal device suitable for a halftone image display or a gradational display.

A display device of the type which controls transmission of light in combination with a polarizing device by utilizing the refractive index anisotropy of ferroelectric liquid crystal (FLC) molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

Although the above display device using FLC is generally utilized as a display device giving two display levels, i.e., a bright (or light) state and a dark state, it is possible to use the FLC device as a display device giving multiple display levels, i.e., halftone (or gradational) display levels.

Heretofore, one of halftone (gradational) display methods, in which an area ratio of bistable states within one pixel is controlled (hereinbelow, referred to as "area modulation method"), has been applied to the FLC device. However, the FLC device using an area modulation method has encountered a problem such that it is difficult to control a display area of bistable states within a pixel because the FLC device has steep threshold voltage characteristics due to bistability of the FLC.

Gradational display methods also include:

(1) a method of dividing pixels into a plurality of sections and independently driving the sections (dither system);

(2) a method of generating potential gradient within a pixel to divide a display region (potential gradient method);

(3) a method wherein an electric field in one direction is applied to a liquid crystal placed in a monostable state to control a displacement of a longer axis of liquid crystal molecules depending on a strength of the electric field; and (4) a method wherein an electric field strength applied to a liquid crystal layer is controlled by changing a thickness of the liquid crystal layer within a pixel to effect a gradational display.

However, the above methods (1)–(4) are required to device a production method of a liquid crystal cell in order to realize a gradational display and required to have a complicated production step such as an additional cell preparation step.

In addition, when a liquid crystal display device (or apparatus) is constituted by using the above methods and is used for display, it is difficult to obtain uniform driving characteristics over the entire device. Particularly, with respect to a chiral smectic liquid crystal, physical properties and alignment (or orientation) states required for achieving uniform driving characteristics and sufficient gradational display characteristics are not sufficiently clarified, thus failing to provide gradational display characteristics sufficient for practical use.

SUMMARY OF THE INVENTION

An object of the present invention is to provide a liquid crystal device for a gradational display having improved gradational display characteristics.

According to a first aspect of the present invention, there is provided a liquid crystal device for gradational display, comprising: a pair of substrates each provided with an electrode, and a liquid crystal layer comprising a chiral smectic liquid crystal disposed between the substrates; said pair of substrates each having thereon an alignment control layer provided with a uniaxial alignment axis, wherein aid liquid crystal layer comprises a striped region and a non-striped region where (1) said striped region and said non-striped region each assume a homogeneous alignment state, (2) said striped region extends in a direction perpendicular to the direction of said uniaxial alignment axis, and (3) each of liquid crystal molecules within said striped region and said non-striped region show bistability; and said liquid crystal molecules within said striped region have a threshold voltage, for switching between two stable states, different from that given by said liquid crystal molecules within said non-striped region.

This and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
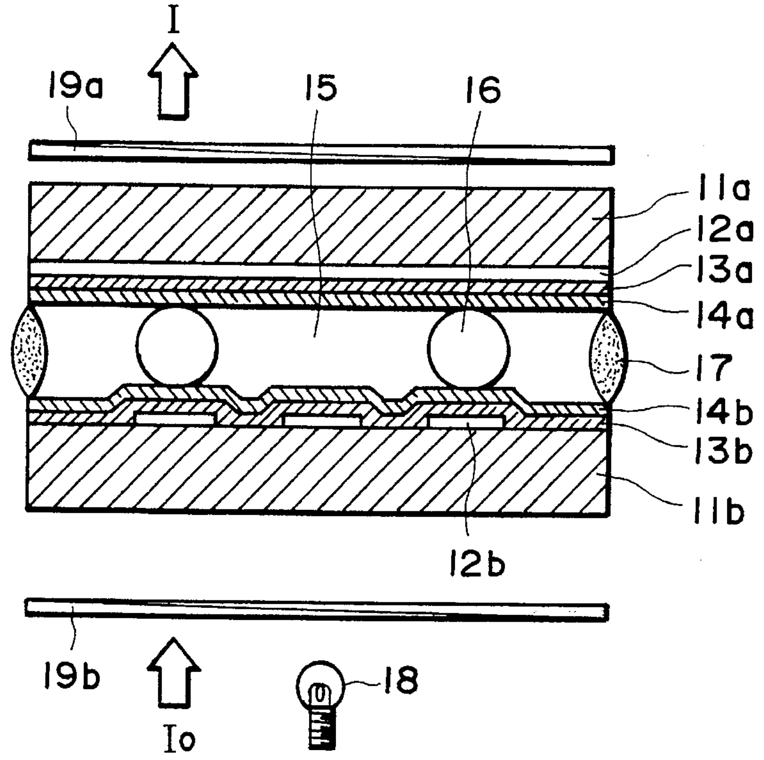
FIG. 1 is a schematic sectional view of an embodiment of the liquid crystal device for a gradational display according to the present invention.

The liquid crystal device according to the present invention will be explained in detail.

The liquid crystal device according to the present invention effects a gradational display by using a liquid crystal having two different alignment regions, including a striped region (or streak region) and a non-striped region (or non-streak region), formed by once keeping a resultant liquid crystal cell (or device) at low temperature (e.g., −10° C.).

In the meantime, our research group has disclosed temperature characteristics of a liquid crystal in case where the liquid crystal is kept at low temperature (EP-A-0571955). More specifically, when a chiral smectic liquid crystal is left standing at low temperature, a layer inclination angle δ in smectic phase has a temperature dependence such that the layer inclination angle δ increases on temperature decrease down to a mediate temperature (providing a maximum $\delta_{MAX}$) and decreases on further temperature decrease below the mediate temperature, thus showing a temperature characteristic giving an upward convex curve. In case where a liquid crystal cell including the chiral smectic liquid crystal is further cooled to a temperature below a temperature (TδS) at which the inclination angle shows zero degrees and a single X-ray diffraction peak is observed (i.e., a temperature changing a layer structure from a chevron structure to a bookshelf structure), various properties of the liquid crystal are different from those before the cooling when the liquid crystal cell is restored to room temperature condition even if the temperature TδS is higher than a crystallized temperature of the liquid crystal. That is, many properties such as a layer inclination angle δ, an apparent tilt angle $\theta a$ (defined as a half of an angle between first and second extinct positions), a contrast ratio C/R, and an alignment state of liquid crystal molecules are changed by cooling, thus failing to restore to those of the initial stage. This leads to deterioration in display characteristics of the liquid crystal cell using such a liquid crystal and poses a problem at the time of storage or use of the liquid crystal cell at a low-temperature.

Our research group has accomplished the present invention based on such a discovery that two different display (or alignment) regions comprising a bistable and uniform striped region in a direction perpendicular to a rubbing direction and a bistable and uniform non-striped region are formed within a display area in case where a liquid crystal device is left standing (or retained) for a prescribed period of time at a temperature (T) (herein, referred to as "storage temperature") equal to or lower than TδS (i.e., a temperature at which a layer structure is changed from a chevron structure to a bookshelf structure). The storage temperature (T) may preferably satisfy the relationship of: TδS−15 (° C.) ≦T≦TδS, more preferably −25 (° C.)≦T≦−5 (° C.).

Further, the liquid crystal device may preferably be left standing for 3 to 20 hours at the storage temperature (T).

Our research group presumes that the above-mentioned striped region appears in order to compensate distortion or deformation due to shrinkage (or contraction) and/or expansion of a layer structure during structural changes (i.e., chevron→bookshelf→chevron) with temperature changes (i.e., room temperature→low temperature→room temperature).

Figure 2:
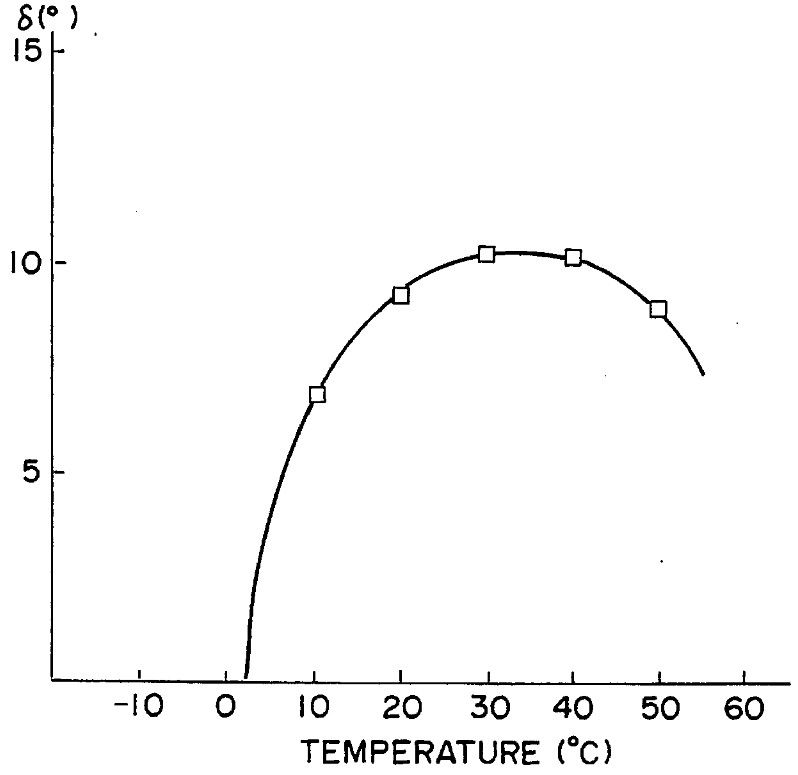
FIG. 2 is a graph showing a temperature characteristic of a layer inclination angle δ of a liquid crystal composition A used in Example 1 of the invention and Comparative Example 1.

Japanese Laid-Open Patent Application (JP-A) No. 2-8292 discloses an alignment state of a linear response-irregularity portion which is apparently similar to the striped region of the present application, i.e., generated in a direction perpendicular to the direction of alignment treatment, when a ferroelectric liquid crystal is cooled (FIG. 2 of JP-A No. 2-8292). The linear response-irregularity portion does not respond to an applied pulse voltage, thus being clearly distinguished from a bistable striped region used in the present invention.

JP-A No. 3-136020 (corresponding to EP-A 405346) discloses a gradational display method utilizing an obliquely aligned stripe texture obtained by cooling a chiral smectic liquid crystal having a helical pitch (of SmC*) of at most 1 μm from an isotropic liquid while applying an AC voltage. On the other hand, the chiral liquid crystal used in the present invention has a helical pitch (P) of about 10–25 μm which is larger than a thickness (d) (e.g., 1.2 μm) of a liquid crystal layer (i.e., P>d). Further, in the present invention, an AC voltage is not applied at the time of cooling a liquid crystal from an isotropic liquid.

JP-A No. 2-6925 (corresponding to U.S. Pat. No. 4,986,638) discloses an alignment state, in which liquid crystal molecules are aligned or oriented in various directions, which is different from a uniform monodomain alignment state in which plural layers of liquid crystal molecules are successively aligned or oriented in one direction (i.e., plural layers are parallel to each other). In the present invention, the striped and non-striped regions respectively show a uniform monodomain alignment and also show a common extinct position (i.e., a position providing the lowest transmittance), thus being different from the alignment state of JP-A No. 2-6925.

The striped region characteristic of the present invention according to the second aspect shows a lower threshold voltage for switching compared with the surrounding region. As a result, a display area is divided into a lower threshold voltage region (i.e., striped region) and a higher threshold voltage region (i.e., non-striped region), thus facilitating a partial inversion to realize a good gradational display.

A preferred embodiment of the liquid crystal device according to the present invention will be explained.

FIG. 1 shows a schematic sectional view of an embodiment of the liquid crystal device according to the present invention.

Referring to FIG. 1, the liquid crystal device includes a liquid crystal layer comprising chiral smectic liquid crystal 15 disposed between a pair of glass substrates 11*a* and 11*b* each having thereon a transparent electrode 12*a* or 12*b*, an insulating layer 13*a* or 13*b* and an alignment control layer 14*a* or 14*b*. Instead of the insulating layer and an alignment control layer, it is possible to dispose an insulating alignment control layer on the transparent electrode 12*a* or 12*b*. Outside the substrates 11*a* and 11*b*, a pair of polarizers 19*a* and 19*b* are disposed so as to modulate incident light $I_0$ from a light source 18 in cooperation with the liquid crystal 15 to provide modulated light I. The alignment control layers 14*a* and 14*b* sandwiching the liquid crystal layer are held at a prescribed gap (e.g., 0.1–3 μm) with a spacer 16 and the periphery of the liquid crystal layer is sealed with a sealing material 17.

Each of two glass substrates 11*a* and 11*b* are coated with a transparent electrode 12*a* or 12*b* comprising a layer of $In_2O_3$ or ITO (indium-tin-oxide) to form an electrode plate. Further thereon, an insulating layer 13*a* or 13*b* (e.g., a film of $SiO_2$, $TiO_2$ or $Ta_2O_5$) having a thickness of 200–3000 Å and an alignment control layer 14*a* or 14*b* (e.g., a film of polyimide) having a thickness of 50–1000 Å are successively formed. For example, the alignment control layer 14*a* or 14*b* is formed by rubbing a film of polyimide in one direction with gauze or acetate fiber-planted cloth so as to uniaxially align the liquid crystal molecules in the rubbing direction (i.e., uniaxial alignment treatment). Two electrode plates each provided with the insulating layer and/or the alignment control layer are held with spacers 16 (e.g., silica beads or alumina beads having a prescribed diameter) and are applied to each other with a sealing material 17 (e.g., an epoxy adhesive) while keeping a prescribed cell gap (e.g., 0.1–3 μm). The gap is filled with a chiral smectic liquid crystal 15, e.g., in the following manner. The sealing agent sealing the periphery of the gap is provided with an injection port for filling the liquid crystal. Under vacuum condition, the liquid crystal is applied to the injection port and the periphery thereof, heated into an isotropic liquid, and injected into the gap and, after sealing the injection port, is gradually cooled to room temperature to obtain a liquid crystal cell. Then, the liquid crystal cell is cooled to a temperature of at most TδS of the liquid crystal and kept at the temperature for a prescribed period of time, followed by restoration to room temperature, thus preparing a liquid crystal device of the present invention.

The values of layer inclination angle δ and pretilt angle α referred to herein are based on values measured according to the following methods.

Measurement of layer inclination angle δ

The method used was basically similar to the method used by Clark and Largerwal (Japanese Display '86, Sep. 30–Oct. 2, 1986, p.p. 456–458) or the method of Ohuchi et al (J.J.A.P., 27 (5) (1988), p.p. 725–728). The measurement was performed by using a rotating anode-type X-ray diffractometer using CuKα X-rays (available from MAC Science) as a measurement apparatus. An 80 μm-thick glass ("Micro Sheet" available from Corning Glass Works) was used as a glass substrate in order to minimize the X-ray absorption with the glass substrate, otherwise an ordinary step of forming a liquid crystal cell was applied.

More specifically, in order to obtain a gap or distance between liquid crystal layers, a bulk liquid crystal was applied onto a sample glass. The gap was obtained by effecting 2θ/θ scan in the same manner as in powder X-ray diffraction analysis. A layer inclination angle δ was measured in the following manner. A cell having a gap of 80 μm was prepared by using a pair of the above-mentioned 80 μm thick glass substrates and a spacer comprising a 80 μm-thick glass identical to the above substrates. The cell was filled with a liquid crystal at a temperature of isotropic liquid and then gradually cooled while applying a magnetic field to the cell in the direction parallel to the substrates in an electromagnet, thus preparing a sample cell which had been subjected to a homogeneous alignment treatment. An X-ray detector was set to a diffraction angle 2θ providing the above-obtained layer gap and then the sample cell was subjected to θ scan, thus obtaining the layer inclination angle δ according to the above-mentioned method. In this instance, the values of δ is inherent in the liquid crystal substantially free from cell thickness-dependence. In the case where the above-mentioned magnetically aligned 80 μm-thick cell is changed to a cell having a cell gap of 1.3 μm prepared by using a polyimide resin precursor (LQ-1802, available from Hitachi Kasei Kogyo K.K.) for an alignment film and rubbing the alignment film, it is possible to obtain values of a layer inclination angle δ substantially identical to those measured by the above-mentioned method.

Measurement of pretilt angle α

The measurement was performed according to the crystal rotation method as described at Jpn. J. Appl. Phys. vol. 19 (1980), No. 10, Short Notes 2013.

More specifically, a cell was filled with a standard liquid crystal mixture for measurement assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

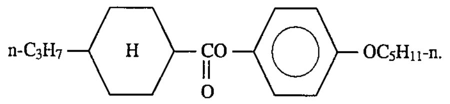

For measurement, the liquid crystal cell was rotated in a plane perpendicular to the pair of substrates and including the aligning treatment axis (rubbing axis) and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

A pretilt angle α was obtained through a simulation wherein a fitting of a spectrum of the intensity of the transmitted light formed by interference was effected to the following theoretical curves (a) and (b):

$$T(\phi)=\cos^2\left[\frac{\pi d}{\lambda}\left(\frac{NeNo\sqrt{N^2(\alpha)-\sin^2\phi}}{N^2(\alpha)}-\sqrt{No^2-\sin^2\phi}-\frac{Ne^2-No^2}{N^2(\alpha)}\sin\alpha\cdot\cos\alpha\cdot\sin\phi\right)\right],\text{and}\qquad (a)$$

$$N(\alpha)\equiv\sqrt{No^2\cdot\cos^2\alpha+Ne^2\cdot\sin^2\alpha}\ ,\qquad (b)$$

wherein No denotes the refractive index of ordinary ray, Ne denotes the refractive index of extraordinary ray, φ denotes the rotation angle of the cell, T(φ) denotes the intensity of the transmitted light, d denotes the cell thickness, and λ denotes the wavelength of the incident light.

Hereinbelow, the present invention will be described more specifically based on Examples.

EXAMPLE 1

A liquid crystal composition A was prepared by mixing the following mesomorphic compounds in the indicated proportions.

| Structural formula | wt. parts |
| --- | --- |
| 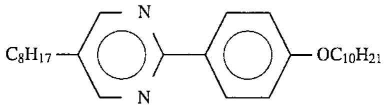 | 8 |
| 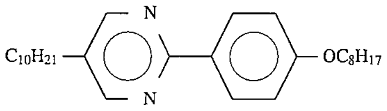 | 10 |
| 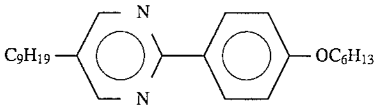 | 6 |
| 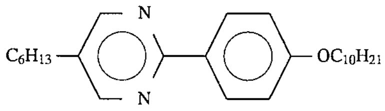 | 6 |
| 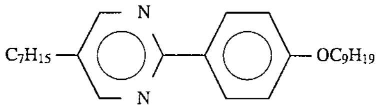 | 2 |
| 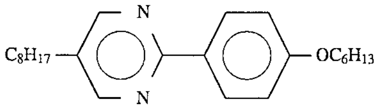 | 5 |
| 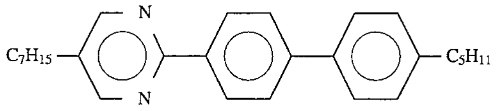 | 3 |
| 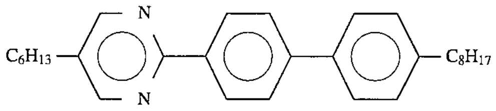 | 3 |
| 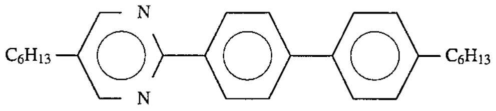 | 8 |
| 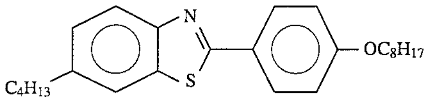 | 3 |
| 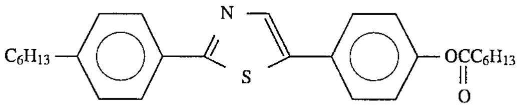 | 6 |
| 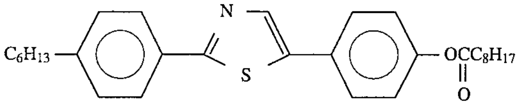 | 2 |
| 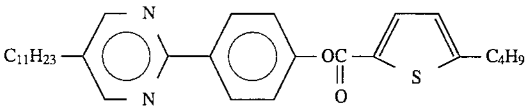 | 7 |

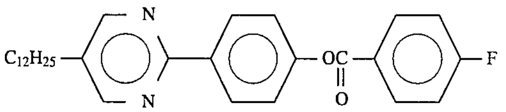
4

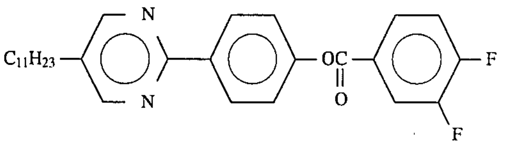
2

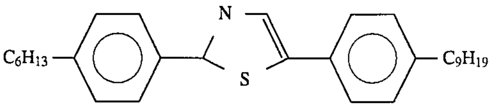
11

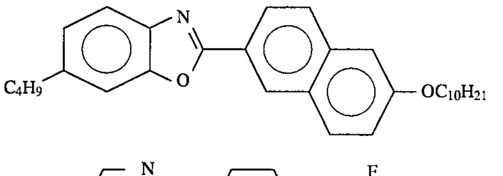
4

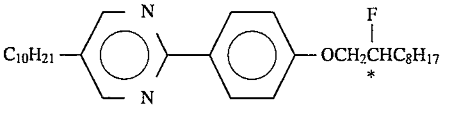
10

The liquid crystal composition A showed the following phase transition series.

Phase transition temperature (°C.)

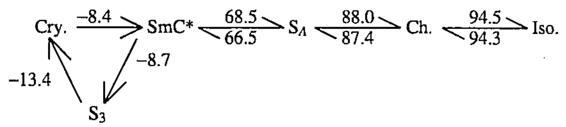

In the above, the respective symbols denote the following phases; Iso.: isotropic phase; Ch: cholesteric phase; $S_A$: smectic A phase; SmC*: chiral smectic C phase; $S_3$: smectic phase (un-identified) other than $S_A$ and SmC*; and Cry.: crystal.

The phase transition temperature (° C.) is determined by microscopic observation in combination with a differential scanning calorimeter (manufactured by Parkinelmar Co.) and Metlar Hot Stage (manufactured by Metlar Co.).

The liquid crystal composition A had a temperature characteristic of a layer inclination angle δ show in FIG. 2.

A liquid crystal device as shown in FIG. 1 was prepared in the following manner.

Two 1.1 mm-thick glass plates (11*a* and 11*b*) were provided and respectively coated with a 0.07 mm thick ITO film (12*a* or 12*b*) to form an electrode for voltage application, which was further coated with a 0.1 mm-thick insulating layer of vapor-deposited $SiO_2$ (13*a* or 13*b*). The insulating layer was further coated with a 0.2% isopropyl alcohol solution of silane coupling agent ("KBM-602" available from Shin Etsu Kagaku K.K.) by spin coating at 2000 r.p.m. for 15 sec., followed by drying at 120° C. for 20 min. The glass plate thus treated was further coated with a 1.0%-solution of polyimide resin precursor (LQ-1802, available from Hitachi Kasei Kogyo K.K.) in N-methyl-2-pyrrolidone by a spinner coater rotating at 2000 rpm for 15 seconds. Thereafter, each of the coating film was subjected to heat curing at 270° C. for 60 min. to obtain about a 200 Å-thick alignment film (14*a* or 14*b*).

The coating film was rubbed with nylon-planted cloth to effect uniaxial alignment treatment. The thus treated two glass plates were washed with isopropyl alcohol. After silica beads (16) with an average particle size of 1.2 μm were dispersed on one of the glass plates, the two glass plates were applied to each other with a bonding sealing agent (17) ("Lixon Bond", available from Chisso K.K.) so that their rubbed directions were parallel to each other and heated at 100° C. for 60 min. to form a blank cell.

Then, the above-prepared liquid crystal composition A (15) was heated into an isotropic liquid, and injected into the above prepared cell under vacuum and, after sealing, was gradually cooled to room temperature under no AC electric field application to prepare a liquid crystal cell.

The above-prepared cell as then left standing for 15 hours at −9° C. (i.e., storage temperature), and warmed to 30° C. in 3 hours under no AC electric field application to obtain a liquid crystal device according to the present invention. At this time, the liquid crystal device showed an alignment state of the liquid crystal composition A shown in FIG. 3 through microscope observation. The liquid crystal composition A showed a temperature (TδS) giving a single X-ray diffraction peak of 2° C. in a low-temperature side.

Figure 3:
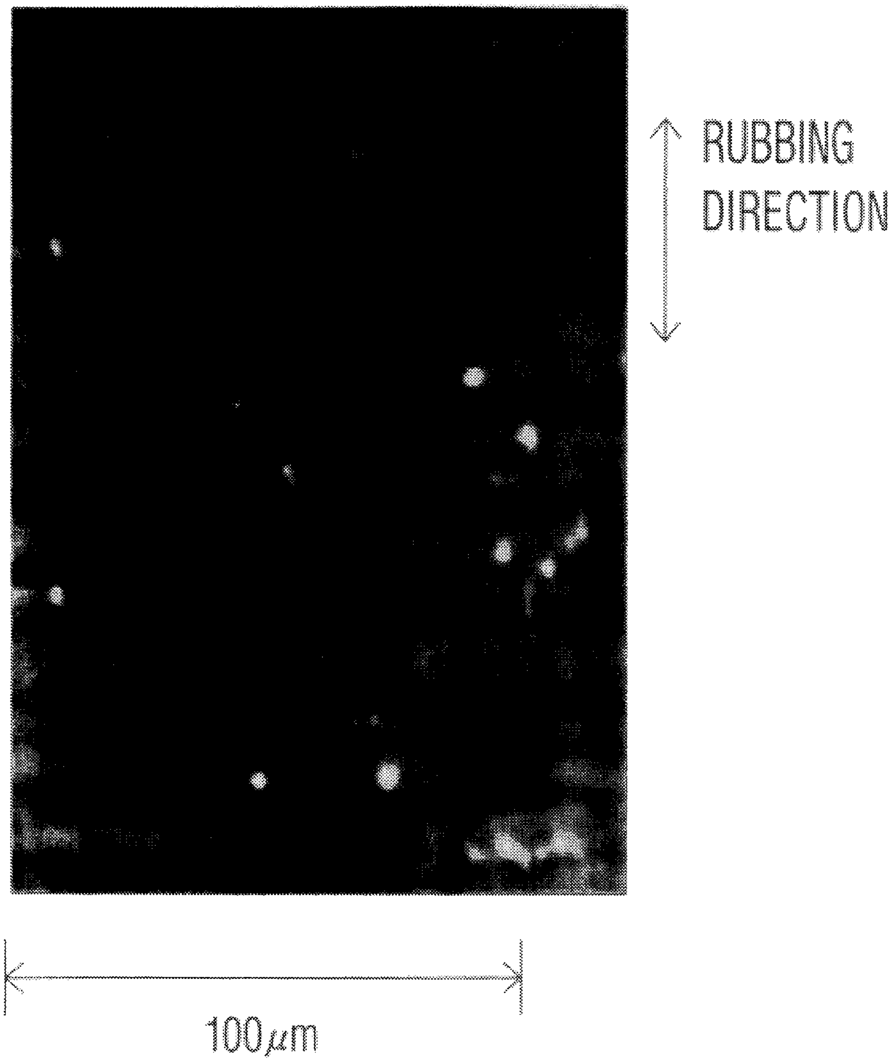
FIG. 3 is a photograph showing an alignment state of a liquid crystal after low temperature storage of the liquid crystal device in Example 1 of the invention.
Figure 11:
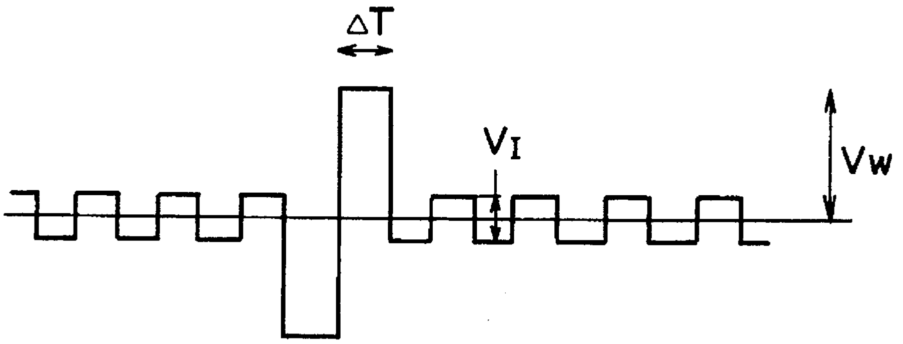
FIG. 11 is a diagram of a pulse voltage waveform applied to the liquid crystal devices in Example 1 and Comparative Example 1.

As shown in FIG. 3, the liquid crystal device showed a liquid crystal layer (i.e., a display region) comprising a minute striped region and a non-striped region. The striped region was generated in a direction perpendicular to the rubbing direction (i.e., the direction of a uniaxial alignment axis). Then, when the liquid crystal device was supplied with an appropriate pulse voltage waveform (e.g., one shown in FIG. 11) with an appropriate writing pulse voltage Vw and a sequent pulse voltage $V_I$, the display region was changed to a partially inverted state shown in FIG. 4. As a result, it was confirmed that the minute striped region shown in FIG. 3 had a threshold voltage for switching lower than that of the surrounding region and the switching of the liquid crystal molecules was caused to occur from the minute striped region. When the above electric field application was terminated, the display region in the partially inverted state was substantially maintained, thus showing a good memory characteristics (FIG. 5).

Figure 4:
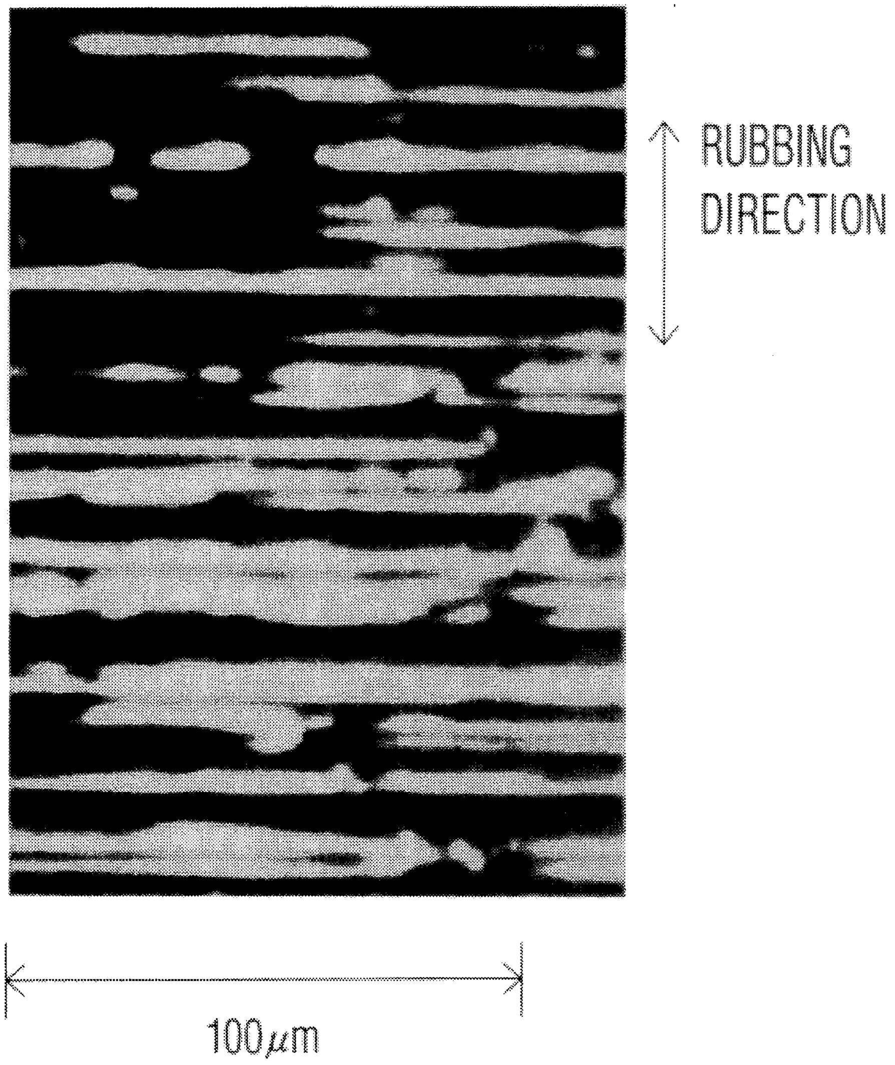
FIG. 4 is a photograph showing a partially inverted alignment state of a liquid crystal at the time of driving of the liquid crystal device in Example 1 of the invention.
Figure 5:
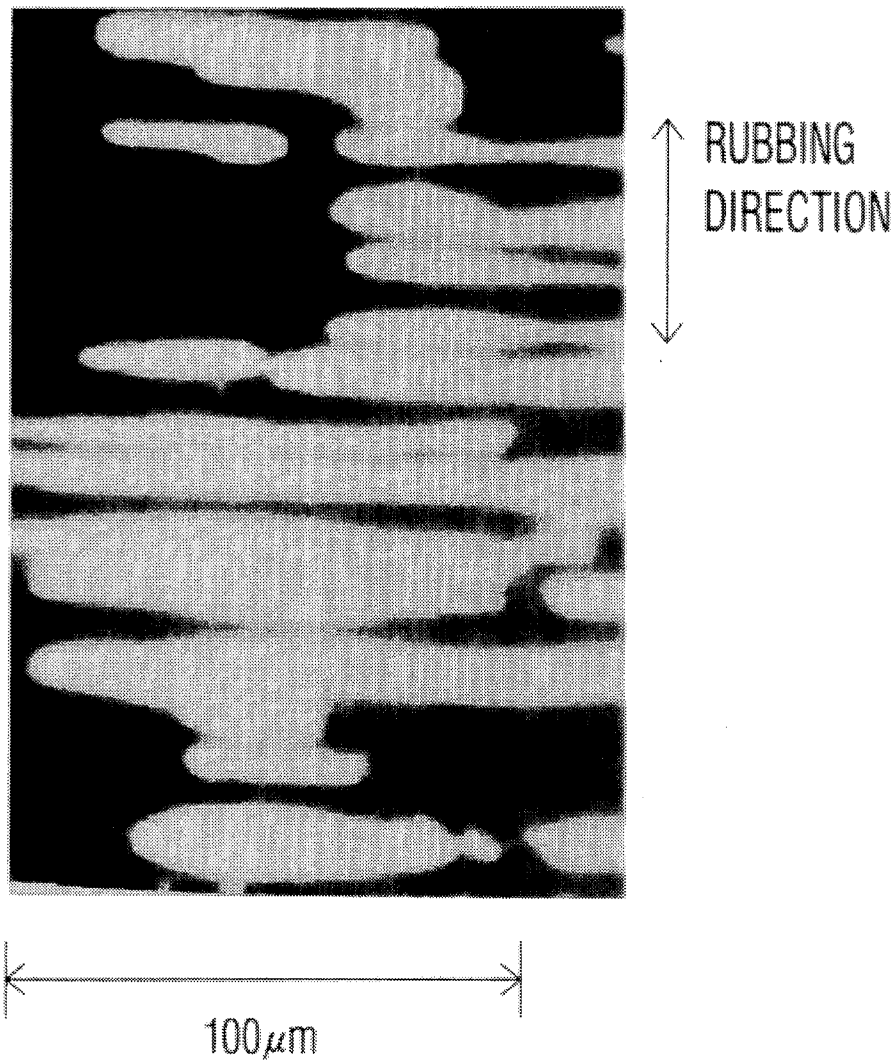
FIG. 5 is a photograph showing a partially inverted alignment state of a liquid crystal at the time of a memory stage (i.e., in the absence of an electric field) of the liquid crystal device in Example 1 of the invention.

As apparent from the above results as shown in FIGS. 4 and 5, the above striped region giving a low threshold voltage was effective in performing a gradational display. In the state shown in FIG. 5, when a writing pulse voltage Vw or a pulse width ΔT (e.g., shown in FIG. 11) was increased, the liquid crystal molecules were switched between two states giving white and black states. Thus, it was confirmed that the entire alignment state shown in FIG. 3 was bistable.

The liquid crystal composition A had a helical pitch in SmC* phase of 11 μm at 30° C.

COMPARATIVE EXAMPLE 1

Figure 6:
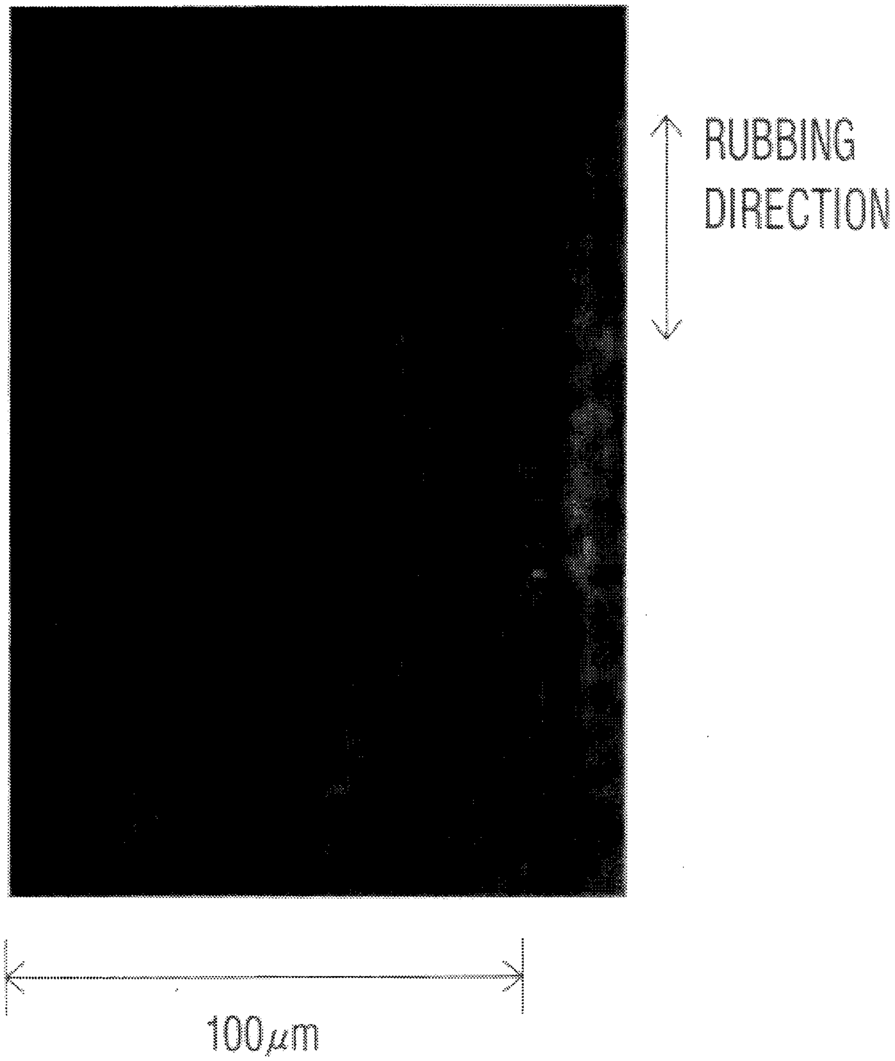
FIG. 6 is a photograph showing an alignment state of a liquid crystal after cooling through an isotropic state of the liquid crystal device in Comparative Example 1.
Figure 7:
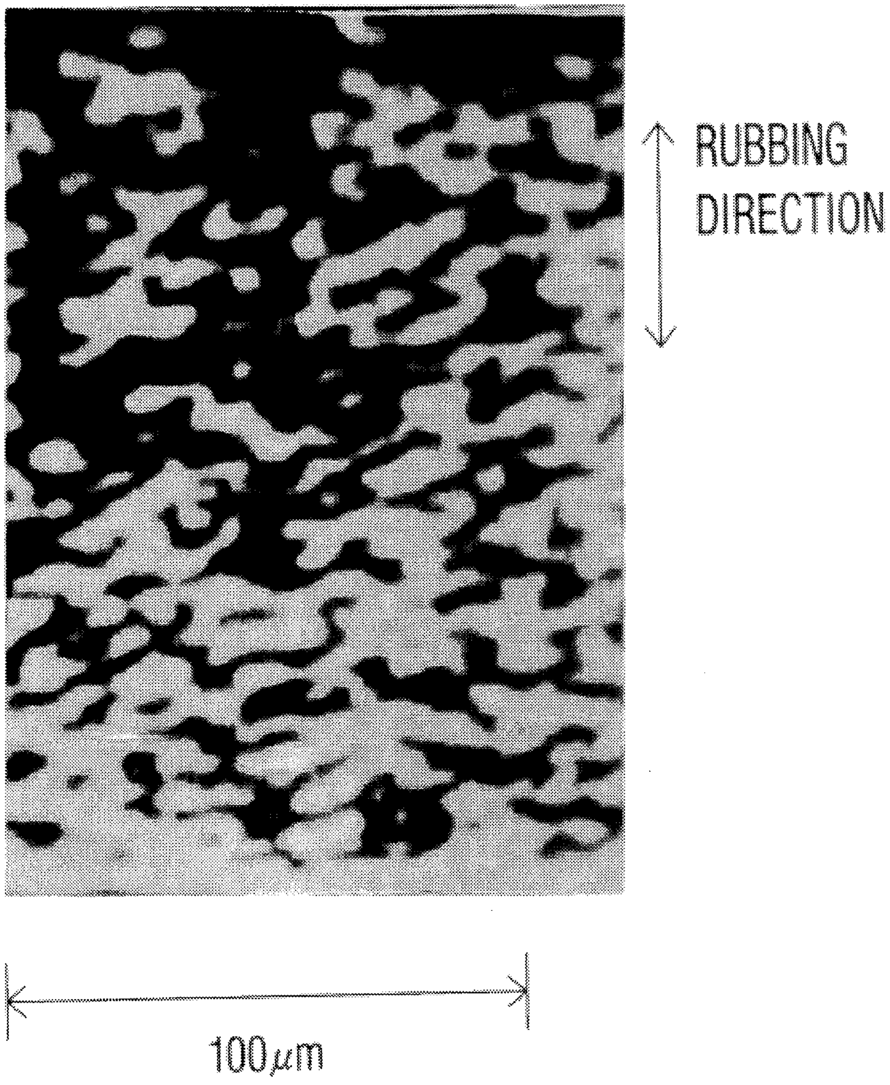
FIG. 7 is a photograph showing a partially inverted alignment state of a liquid crystal at the time of driving of the liquid crystal device in Comparative Example 1 of the invention.
Figure 8:
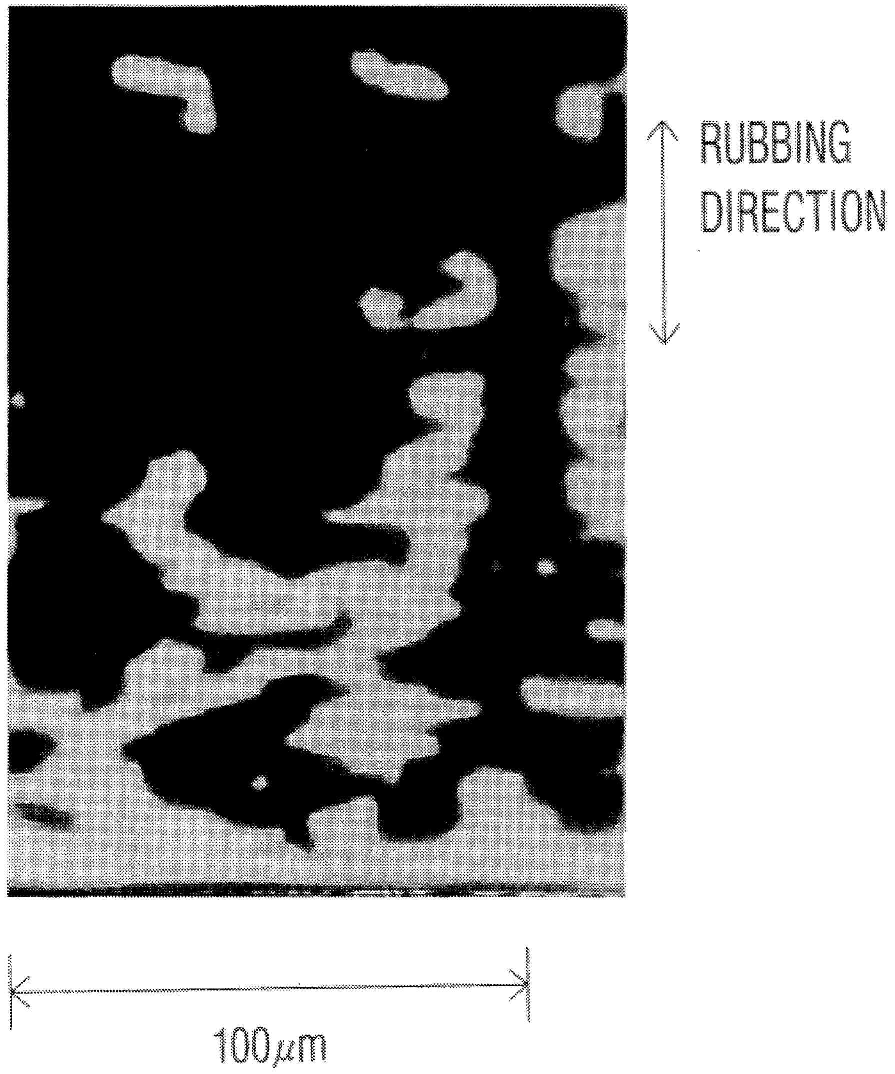
FIG. 8 is a photograph showing a partially inverted alignment state of a liquid crystal at the time of a memory stage (i.e., in the absence of an electric field) of the liquid crystal device in Comparative Example 1 of the invention.

The liquid crystal device used in Example 1 was heated to 100° C. so that the liquid crystal composition A assumed an isotropic phase. Then, the liquid crystal device was left standing for about 1 hour so as to be cooled to 30° C. At this time, the liquid device showed a display region having an alignment state shown in FIG. 6 in the same position as in FIG. 3. As shown in FIG. 6, the minute striped region shown in FIG. 3 disappeared. The liquid crystal device was subjected to observation of an alignment state in the same manner as in Example 1 with respect to FIGS. 4 and 5, whereby alignment states shown in FIGS. 7 and 8 were observed, respectively. The alignment states shown in FIGS. 7 and 8 were clearly different from those shown in FIG. 4 and 5, respectively.

Figure 9:
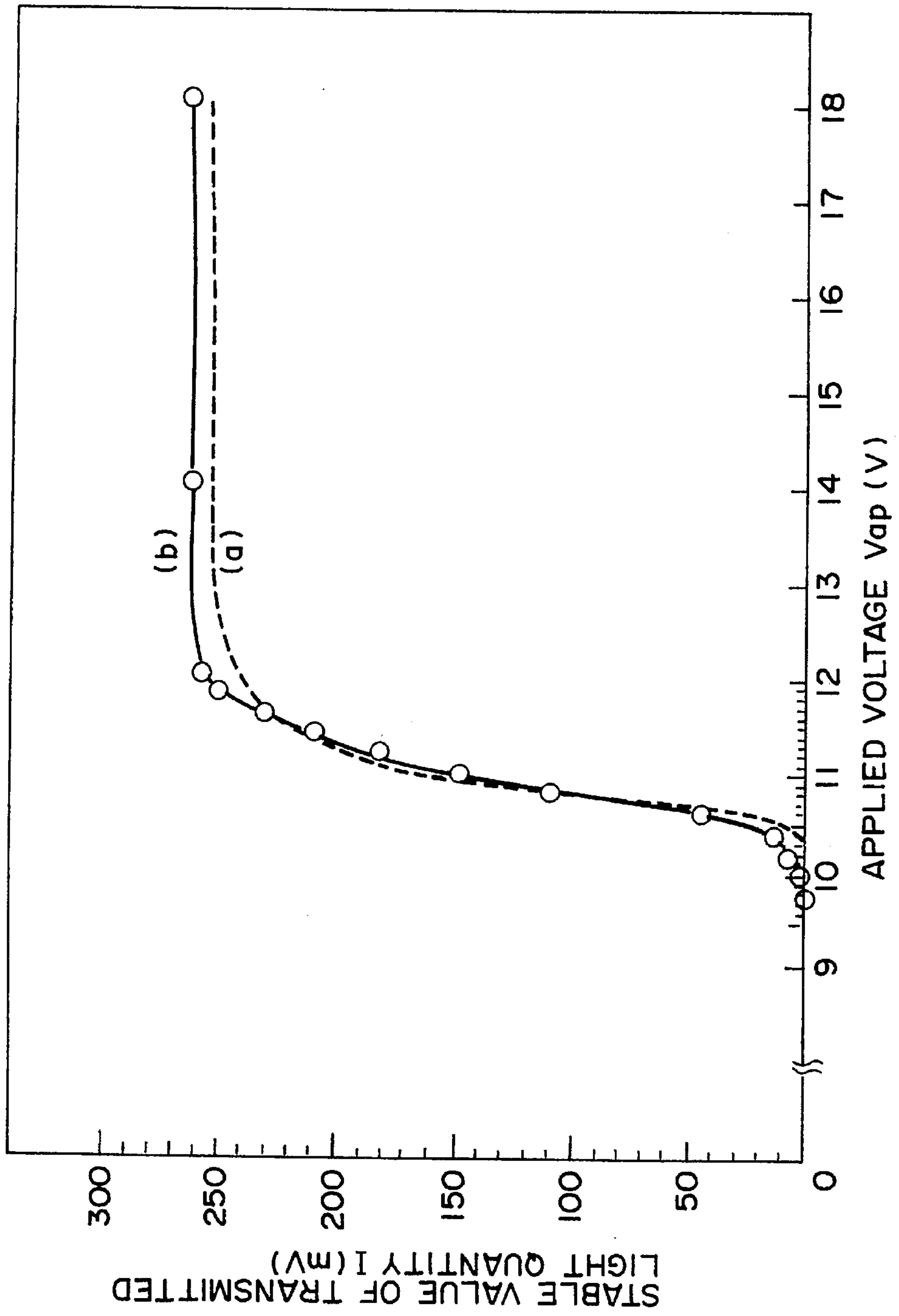
FIG. 9 is a graph showing a change in light transmittance with respect to two liquid crystal devices used in Example 1 and Comparative Example 1 at different applied pulse voltages.
Figure 10:
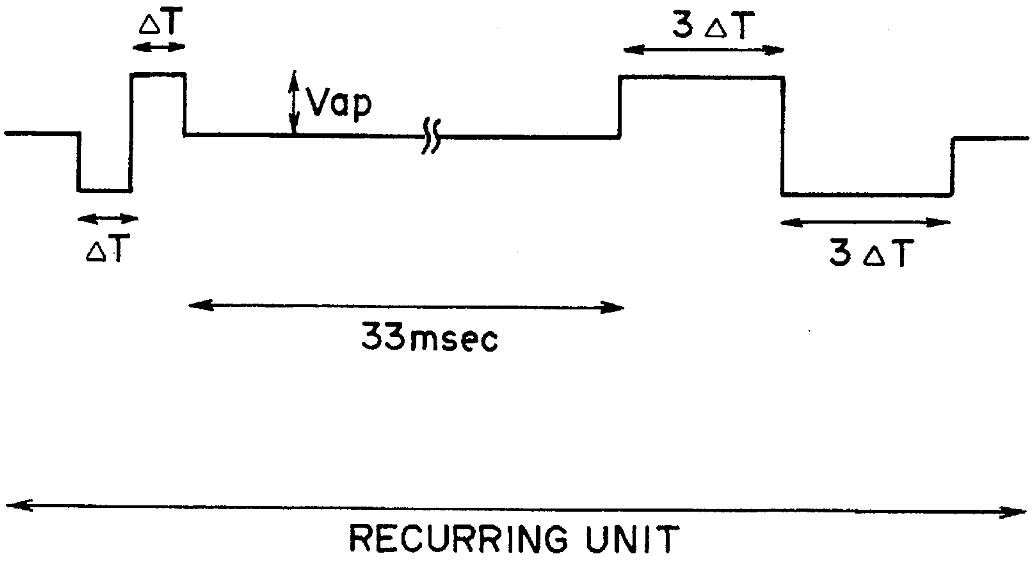
FIG. 10 is a diagram of an embodiment of a pulse voltage waveform applied to a liquid crystal device.

Separately, each of the liquid crystal devices giving the alignment states shown in FIGS. 3 and 6 was subjected to repetitive bipolar pulse (pulse width ΔT=50 μsec) application using a pulse voltage waveform shown in FIG. 10 while changing an applied voltage (Vap) under a right-angle cross nicol relationship. At this time, the liquid crystal device provided an optical response characteristic shown in FIG. 9, measured by a photomultiplier (available from Hamamatsu Photonics K.K.), in which a change in a stable value of transmitted light quantity (I) against different applied voltages (Vap) was shown. Referring to FIG. 9, a full line (b) denotes a curve regarding the minute striped region in Example 1, and on the other hand a dotted lien (a) denotes a curve regarding the alignment state after cooling from isotropic phase in this comparative example.

When a parameter ($\gamma^{0-100}$) representing a possibility of gradational display is defined as the following equation:

$$\gamma^{0-100}=Vsat/Vth$$

wherein Vsat denotes an applied voltage at the time of saturation of light transmittance (i.e., a value of I in FIG. 9) and Vth denotes an applied voltage giving a threshold value of I in FIG. 9 (i.e., a voltage at which a value of I starts to increase), the value of $\gamma^{0-100}$ is required to satisfy the relationship: $1.5<\gamma^{0-100}<2$ in order to realize gradational display, according to our study. More specifically, if a value of $\gamma^{0-100}$ is not sufficiently small, it is impossible to effect gradational display. On the other hand, if a value of $\gamma^{0-100}$ is too small, there occurs a crosstalk phenomenon. Accordingly, the above range of $\gamma^{0-100}$ is determined.

When each of a value of $\gamma^{0-100}$ regarding the above two curves (a) and (b) shown in FIG. 9 was calculated, the following results were obtained.

$\gamma^{0-100}$ of Curve (*b*) (Ex. 1) = 18.0/9.8 = 1.84

$\gamma^{0-100}$ of Curve (*a*) (Comp. Ex. 1) = 14.0/10.0 = 1.40

Thus, it was confirmed that the liquid crystal device prepared in Example 1 according to the present invention was suitable for gradational display.

EXAMPLE 2

The liquid crystal device used in Example 1 was left standing for 15 hours at the indicated storage temperatures in Table 1, respectively. Each of the liquid crystal devices was warmed to 30° C. and subjected to observation of an alignment state in the same manner as in Example 1, and was further subjected to measurement of $\gamma^{0-100}$ in the same manner as in Comparative Example 1. The results are shown below.

TABLE 1

| Storage temp. | Minute striped region | $\gamma^{0-100}$ |
|---|---|---|
| 27 (°C.) | Not observed | 1.40 |
| 11 | " | 1.40 |
| 3 | " | 1.39 |
| −8 | Observed | 1.88 |
| −11 | " | 1.86 |
| −30 | Not observed | * |

*: Not measurable due to monostabilization.

As apparent from Table 1, by retaining the liquid crystal device at a storage temperature of at most TδS (=2° C.), it was possible to realize a minute stripe region (i.e., a low threshold region), thus improving a gradational characteristic.

As described hereinabove, according to the present invention, by utilizing two regions different in a threshold voltage characteristics within a display region, good partial inversion was realized, thus providing a practical liquid crystal device suitable for gradational display.

What is claimed is:

1. A liquid crystal device for gradational display, comprising:

a pair of substrates each provided with an electrode, and a liquid crystal layer comprising a chiral smectic liquid crystal disposed between the substrates; said pair of substrates each having thereon an alignment control layer provided with a uniaxial alignment axis, said liquid crystal layer comprises a first region and a second region wherein (1) said first region and said second region each assume a homogeneous alignment state, (2) said first region extends in a direction perpendicular to an average direction of said uniaxial alignment axes, (3) liquid crystal molecules within said first region and said second region show bistability such that the liquid crystal molecules within said first region are responsive to an applied pulse voltage, and (4) the liquid crystal molecules within said first region have a threshold voltage for switching between two stable states which is different from that given by said liquid crystal molecules within said second region thereby to effect gradational display, and said chiral smectic liquid crystal provides a single X-ray diffraction peak at a prescribed temperature at which said liquid crystal layer shows a layer inclination angle δ of zero degrees.

2. A device according to claim 1, wherein said first region and said second region are obtained by retaining said liquid crystal device after disposing said liquid crystal layer between the substrates for a prescribed period of time at a storage temperature (T) of at most a temperature (TδS) giving said single X-ray diffraction peak at said zero degree inclination angle.

3. A device according to claim 2, wherein said storage temperature (T) satisfies the following relationship:

$$T\delta S-15 \leqq T \leqq T\delta S \text{ (° C.)}.$$

4. A device according to claim 2, wherein said storage temperature (T) satisfies the following relationship:

$$-25 \leqq T \leqq -5 \text{ (° C.)}.$$

5. A device according to claim 2, wherein said prescribed period of time at said storage temperature (T) is 3–20 hours.

6. A device according to claim 1, wherein said liquid crystal layer has a thickness (d) and said chiral smectic liquid crystal has a helical pitch (P) satisfying the following relationship:

$$P>d \text{ (μm)}.$$

7. A device according to claim 1, wherein said liquid crystal layer is formed by gradually cooling said chiral smectic liquid crystal from isotropic phase without applying AC electric field.

8. A device according to claim 1, wherein said chiral smectic liquid crystal has a helical pitch of 10–25 μm.

9. A device according to claim 1, wherein an applied voltage to the substrate electrodes giving a saturated light transmittance to said device and an applied voltage to the substrate electrodes giving a threshold light transmittance to said device provide a ratio therebetween in a range of above 1.5 and below 2.

* * * * *

UNITED STATES PATENT AND TRADEMARK OFFICE
CERTIFICATE OF CORRECTION

PATENT NO. : 5,583,682

DATED : December 10, 1996

INVENTOR(S) : HIROYUKI KITAYAMA, ET AL.

It is certified that error appears in the above-identified patent and that said Letters Patent is hereby corrected as shown below:

At [56] References Cited

Under U.S. PATENT DOCUMENTS, add

| | | | |
|---|---|---|---|
| --4,367,924 | 1/11/83 | Clark et al. ....... | 350/334 |
| 4,778,259 | 10/18/88 | Kitayama et al. .... | 350/350S |
| 4,986,638 | 1/22/91 | Yamazaki et al. .... | 350/341 |
| 5,189,536 | 2/23/93 | Hanyu et al. ....... | 359/56--. |

Under FOREIGN PATENT DOCUMENTS, add

| | | |
|---|---|---|
| --405346 | 6/22/90 | EPO |
| 571955 | 12/1/93 | EPO |
| 6925 | 1/11/90 | Japan |
| 8292 | 1/11/90 | Japan |
| 136020 | 6/10/91 | Japan--. |

Please add

--OTHER PUBLICATIONS

Nakano et al., Jap. J. App. Phys.,
Vol. 19, No. 10 (1980) 2013-4.
Ouchi et al., Jap. J. Appl. Phys.,
Vol. 27, No. 5 (1988) 725-8.---.

At [57] ABSTRACT

Line 5, "thereon" should read --thereon an--.
Line 11, (2nd occurrance) of "of" --of the--.
Line 18, "region) having different threshold voltages each other" should read --regions) have different threshold voltages and--.

UNITED STATES PATENT AND TRADEMARK OFFICE
CERTIFICATE OF CORRECTION

PATENT NO. : 5,583,682

DATED : December 10, 1996

INVENTOR(S) : HIROYUKI KITAYAMA, ET AL.

It is certified that error appears in the above-identified patent and that said Letters Patent is hereby corrected as shown below:

COLUMN 1

Line 16, "has generally" should read --generally has a--.
Line 33, "of" should read --of the--.
Line 59, "device" should read --devise--.

COLUMN 3

Line 65, "$-25(°C.)\leqq T\leqq -5(°C.)$. Further," should read -- $-25(°C.)\leqq T\leqq -5(°C.)$. Further,--.

COLUMN 5

Line 40, "Largerwal" should read --Lagerwall--.
Line 41, "Ohuchi et al" should read --Ouchi et al.--.

COLUMN 9

Line 48, "show" should read --shown--.

COLUMN 10

Line 41, "as" should read --was--.
Line 66, "a" should be deleted.

UNITED STATES PATENT AND TRADEMARK OFFICE

CERTIFICATE OF CORRECTION

PATENT NO. : 5,583,682

DATED : December 10, 1996

INVENTOR(S) : HIROYUKI KITAYAMA, ET AL.

It is certified that error appears in the above-identified patent and that said Letters Patent is hereby corrected as shown below:

COLUMN 11

Line 33, "was" should read --were--.
Line 45, "lien" should read --line--.

COLUMN 12

Line 41, "a" should be deleted.

Signed and Sealed this

Eighth Day of July, 1997

Attest:

BRUCE LEHMAN

Attesting Officer

Commissioner of Patents and Trademarks